US010412280B2

United States Patent
Akkaya et al.

(10) Patent No.: US 10,412,280 B2
(45) Date of Patent: Sep. 10, 2019

(54) CAMERA WITH LIGHT VALVE OVER SENSOR ARRAY

(71) Applicant: Microsoft Technology Licensing, LLC, Redmond, WA (US)

(72) Inventors: Onur Can Akkaya, Palo Alto, CA (US); Cyrus Bamji, Fremont, CA (US); Arrigo Benedetti, San Francisco, CA (US); Michael S. Fenton, Palo Alto, CA (US); Jayachandra Gullapalli, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 160 days.

(21) Appl. No.: 15/040,862

(22) Filed: Feb. 10, 2016

(65) Prior Publication Data
US 2017/0230551 A1     Aug. 10, 2017

(51) Int. Cl.
*H04N 5/225*     (2006.01)
*G02B 5/20*     (2006.01)
(Continued)

(52) U.S. Cl.
CPC ........... *H04N 5/2254* (2013.01); *G02B 5/201* (2013.01); *G02F 1/0136* (2013.01);
(Continued)

(58) Field of Classification Search
CPC .... H04N 5/2254; G02B 5/201; G02F 1/0136; G02F 1/133528; G02F 1/19
(Continued)

(56) References Cited

U.S. PATENT DOCUMENTS 3,848,129 A    11/1974   Figler et al.
4,349,277 A     9/1982   Mundy et al.
(Continued)

FOREIGN PATENT DOCUMENTS

CN       101254344 A    9/2008
EP        0583061 A2    2/1994
(Continued)

OTHER PUBLICATIONS

Chen, et al., "Single Camera Imaging System for Color and Near-Infrared Fluorescence Image Guided Surgery", In Journal of Biomedical Optics Express, vol. 5, Issue 8, Jul. 25, 2014, 7 pages.
(Continued)

*Primary Examiner* — Sinh Tran
*Assistant Examiner* — Zhenzhen Wu
(74) *Attorney, Agent, or Firm* — Alleman Hall Creasman & Tuttle LLP (57) ABSTRACT

A camera includes a sensor array including a plurality of individually addressable sensor elements, each of the plurality of sensor elements responsive to incident light over a broad wavelength band. Covering the sensor array is a light valve switchable electronically between closed and open states. The light valve is configured to, in the closed state, block light of a stopband and transmit light outside the stopband, and, in the open state, transmit the light of the stopband. An electronic controller of the camera is configured to switch the light valve from the closed to the open state and, synchronously with switching the light valve, address the sensor elements of the sensor array.

18 Claims, 8 Drawing Sheets

(51) Int. Cl.
  *G02F 1/1335* (2006.01)
  *G02F 1/01* (2006.01)
  *G02F 1/19* (2019.01)

(52) U.S. Cl.
  CPC .......... *G02F 1/133528* (2013.01); *G02F 1/19* (2013.01); *G02F 2001/133531* (2013.01); *G02F 2201/346* (2013.01); *G02F 2203/055* (2013.01)

(58) Field of Classification Search
  USPC .................................................. 348/335, 340
  See application file for complete search history.

(56) References Cited

U.S. PATENT DOCUMENTS

| | | |
|---|---|---|
| 4,621,284 A | 11/1986 | Nishioka et al. |
| 4,627,620 A | 12/1986 | Yang |
| 4,630,910 A | 12/1986 | Ross et al. |
| 4,645,458 A | 2/1987 | Williams |
| 4,679,068 A | 7/1987 | Lillquist et al. |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,243,455 A * | 9/1993 | Johnson .............. G02F 1/13473 349/117 |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,444,235 A * | 8/1995 | Redford .............. H04N 3/1587 250/208.1 |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,809,065 A | 9/1998 | Dapper et al. |
| 5,875,108 A | 2/1999 | Hoffberg et al. |
| 5,877,803 A | 3/1999 | Wee et al. |
| 5,892,612 A | 4/1999 | Miller et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,081,612 A | 6/2000 | Gutkowicz-Krusin et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,183,143 B1 | 2/2001 | Lippold |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,580,459 B2 | 6/2003 | Uchino |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,760,475 B1 | 7/2004 | Miller |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,825,928 B2 | 11/2004 | Liu et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,155,363 B1 | 12/2006 | Rosenthal et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |

(56) References Cited

U.S. PATENT DOCUMENTS

| | | | |
|---|---|---|---|
| 7,257,437 B2 | 8/2007 | Demos et al. |
| 7,259,747 B2 | 8/2007 | Bell |
| 7,274,393 B2 | 9/2007 | Acharya |
| 7,274,454 B2 | 9/2007 | Kowarz et al. |
| 7,289,209 B2 | 10/2007 | Kowarz et al. |
| 7,289,211 B1 | 10/2007 | Walsh, Jr. et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,375,803 B1 | 5/2008 | Bamji |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,440,637 B2 | 10/2008 | Schechner et al. |
| 7,450,736 B2 | 11/2008 | Yang et al. |
| 7,452,275 B2 | 11/2008 | Kuraishi |
| 7,460,160 B2 | 12/2008 | Hershey et al. |
| 7,460,690 B2 | 12/2008 | Cohen et al. |
| 7,489,812 B2 | 2/2009 | Fox et al. |
| 7,536,032 B2 | 5/2009 | Bell |
| 7,538,326 B2 | 5/2009 | Johnson et al. |
| 7,555,142 B2 | 6/2009 | Hildreth et al. |
| 7,560,679 B1 | 7/2009 | Gutierrez |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,421,015 B1 | 4/2013 | Scott et al. |
| 8,462,238 B2 | 6/2013 | Fredembach et al. |
| 8,531,562 B2 | 9/2013 | Schmidt et al. |
| 8,569,681 B2 | 10/2013 | Ovsiannikov et al. |
| 8,988,680 B2 | 3/2015 | Nelson |
| 9,148,589 B2 | 9/2015 | Fischer et al. |
| 2002/0016533 A1 | 2/2002 | Marchitto et al. |
| 2002/0030755 A1 | 3/2002 | Uchino |
| 2003/0098918 A1 | 5/2003 | Miller |
| 2004/0125222 A1 | 7/2004 | Bradski et al. |
| 2004/0252230 A1 | 12/2004 | Winder |
| 2005/0058337 A1 | 3/2005 | Fujimura et al. |
| 2005/0219552 A1 | 10/2005 | Ackerman et al. |
| 2005/0285966 A1 | 12/2005 | Bamji et al. |
| 2006/0221250 A1 | 10/2006 | Rossbach et al. |
| 2007/0087564 A1 | 4/2007 | Speakman |
| 2007/0146512 A1 | 6/2007 | Suzuki et al. |
| 2007/0203413 A1 | 8/2007 | Frangioni |
| 2007/0221849 A1 | 9/2007 | Tabirian et al. |
| 2007/0249913 A1 | 10/2007 | Freeman et al. |
| 2008/0026838 A1 | 1/2008 | Dunstan et al. |
| 2008/0039715 A1 | 2/2008 | Wilson et al. |
| 2008/0255414 A1 | 10/2008 | Voegele et al. |
| 2008/0255425 A1 | 10/2008 | Voegele et al. |
| 2008/0255459 A1 | 10/2008 | Voegele et al. |
| 2008/0255460 A1 | 10/2008 | Voegele et al. |
| 2008/0309913 A1 | 12/2008 | Fallon |
| 2009/0021739 A1 | 1/2009 | Tsujita et al. |
| 2009/0114799 A1 | 5/2009 | Maeda |
| 2014/0078459 A1 | 3/2014 | Kim et al. |
| 2014/0187968 A1 | 7/2014 | Pinho |
| 2014/0232912 A1 | 8/2014 | Morimoto |
| 2014/0263991 A1 | 9/2014 | Therriault-Proulx et al. |
| 2014/0327837 A1* | 11/2014 | Osterman ............... H04N 9/04 349/2 |
| 2014/0347570 A1* | 11/2014 | Osterman ............ G02F 1/0136 349/2 |
| 2015/0092059 A1 | 4/2015 | Lu et al. |
| 2015/0200220 A1 | 7/2015 | Juenger et al. |
| 2015/0234102 A1 | 8/2015 | Kurzweg et al. |
| 2015/0256767 A1 | 9/2015 | Schlechter |

FOREIGN PATENT DOCUMENTS

| | | |
|---|---|---|
| JP | H08044490 A | 2/1996 |
| JP | H1051668 A | 2/1998 |
| JP | H11073491 A | 3/1999 |
| JP | 2002084451 A | 3/2002 |
| JP | 2003198898 A | 7/2003 |
| WO | 9310708 A1 | 6/1993 |
| WO | 9717598 A1 | 5/1997 |
| WO | 9944698 A2 | 9/1999 |

OTHER PUBLICATIONS

Lu, et al., "Designing Color Filter Arrays for the Joint Capture of Visible and Near-Infrared Images", In Proceedings of 16th IEEE International Conference on Image Processing, Nov. 7, 2009, pp. 3797-3800.

Kim, et al., "A 1.5Mpixel RGBZ CMOS Image Sensor for Simultaneous Color and Range Image Capture", In Proceedings of IEEE International Solid-State Circuits Conference Digest of Technical Papers, Feb. 19, 2012, pp. 392-393.

Fisher, S. et al., "Virtual Environment Display System," ACM 1986 Workshop on Interactive 3D Graphics, Oct. 23, 1986, 12 pages.

Azarbayejani, A. et al., "Visually Controlled Graphics," IEEE Transactions on Pattern Analysis and Machine Intelligence, vol. 15, No. 6, Jun. 1993, 4 pages.

Sheridan, T. et al., "Virtual Reality Check," Technology Review, vol. 96, No. 7, Oct. 1993, 9 pages.

"Simulation and Training," Division Incorporated, Available as Early as Jan. 1, 1994, 6 pages.

Granieri, J. et al., "Simulating Humans in VR," Conference of the British Computer Society, Oct. 12, 1994, 15 pages.

Freeman, W. et al., "Television Control by Hand Gestures," Technical Report TR94-24, Mitsubishi Electric Research Laboratories, Dec. 1994, 7 pages.

Breen, D. et al., "Interactive Occlusion and Collision of Real and Virtual Objects in Augmented Reality," Technical Report ECRC-95-02, European Computer-Industry Research Center GmbH, Available as Early as Jan. 1, 1995, 22 pages.

Stevens, J., "Flights Into Virtual Reality Treating Real World Disorders," The Washington Post, Science Psychology, Mar. 27, 1995, 2 pages.

"Virtual High Anxiety," Popular Mechanics, vol. 172, No. 8, Aug. 1995, 1 page.

Kanade, T. et al., "A Stereo Machine for Video-rate Dense Depth Mapping and Its New Applications," IEEE Computer Society Conference on Computer Vision and Pattern Recognition, Jun. 1996, 7 pages.

(56) References Cited

OTHER PUBLICATIONS

Kohler, M., "Vision Based Remote Control in Intelligent Home Environments," Proceedings of 3D Image Analysis and Synthesis 1996, Nov. 1996, 8 pages.
Aggarwal, J. et al., "Human Motion Analysis: A Review," Proceedings of IEEE Nonrigid and Articulated Motion Workshop 1997, Jun. 1997, 13 pages.
Kohler, M., "Techical Details and Ergonomical Aspects of Gesture Recognition applied in Intelligent Home Environments," Technical University of Dortmund, Germany, Jun. 1997, 35 pages.
Pavlovic, V. et al., "Visual Interpretation of Hand Gesture for Human-Computer Interaction: A Review," IEEE Transactions on Pattern Analysis and Machine Intelligence, vol. 19, No. 7, Jul. 1997, 19 pages.
Wren, C. et al., "Pfinder: Real-Time Tracking of the Human Body," IEEE Transactions on Pattern Analysis and Machine Intelligence, vol. 19, No. 7, Jul. 1997, 6 pages.
Kohler, M., "Special Topics of Gesture Recognition Applied in Intelligent Home Environments," Proceedings of International Gesture Workshop, Sep. 1997, 12 pages.
Miyagawa, R. et al., "CCD-Based Range-Finding Sensor," IEEE Transactions on Electron Devices, vol. 44, No. 10, Oct. 1997, 5 pages.
Shao, J. et al., "An Open System Architecture for a Multimedia and Multimodal User Interface," Improving the Quality of Life for the European Citizen, TIDE 98, Jan. 1998, 8 pages.
Isard, M. et al., "Condensation—Conditional Density Propagation for Visual Tracking," International Journal of Computer Vision, vol. 29, No. 1, Aug. 1998, 24 pages.
Brogan, D. et al., "Dynamically Simulated Characters in Virtual Environments," IEEE Computer Graphics and Applications, vol. 18, No. 5, Sep. 1998, 12 pages.
Livingston, M., "Vision-based Tracking with Dynamic Structured Light for Video See-through Augmented Reality," Doctoral Dissertation, University of North Carolina at Chapel Hill, Dec. 1998, 145 pages.
Hongo, H. et al., "Focus of Attention for Face and Hand Gesture Recognition Using Multiple Cameras," Proceedings of the 4th Annual IEEE Conference on Automatic Face and Gesture Recognition, Mar. 2000, 6 pages.
Schechner, Y. et al., "Generalized Mosaicing," Proceedings of the Eighth IEEE International Conference on Computer Vision, ICCV 2001, vol. 1, Vancover, BC, Jul. 7, 2001, 8 pages.
Zhao, L., "Dressed Human Modeling, Detection, and Parts Localization," Doctoral Dissertation, The Robotics Institute, Carnegie Mellon University, Jul. 26, 2001, 121 pages.
Eijk, R., "Beyond the flat screen: Minimal and optimal camera-base distances for viewing 3-D images," Master's Thesis, Eindhoven University of Technology, Aug. 2003, 87 pages.
Qian, G. et al., "A Gesture-Driven Multimodal Interactive Dance System," 2004 IEEE International Conference on Multimedia and Expo, ICME 04, Jul. 2004, 4 pages.
Sinha, S., "Calibration of a Heterogeneous Network of Color and Depth Cameras," Idea for Canesta Vision Contest, Dec. 2004, 3 pages.
He, L., "Generation of Human Body Models," Master's Thesis, University of Auckland, Apr. 2005, 111 pages.
Rosenhahn, B. et al., "Automatic Human Model Generation," Proceedings of the 11th International Conference of CAIP, Sep. 2005, 8 pages.
Hasegawa, S. et al., "Human-Scale Haptic Interaction with a Reactive Virtual Human in a Real-Time Physics Simulator," ACM Computers in Entertainment, vol. 4, No. 3, Article 6C, Jul. 2006, 12 pages.
Cho, J. et al., "Depth Image Processing Technique for Representing Human Actors in 3DTV Using Single Depth Camera," Proceedings of 3DTV Conference, May 2007, 4 pages.
Wang, O. et al., "Automatic Natural Video Matting with Depth," 15th Pacific Conference on Computer Graphics and Applications, Oct. 2007, 4 pages.
"3DV Systems—Zmini—Discontinued," ThingLab Website, Available Online at www.thinglab.co.uk/scanning_product.php?URL_=product_digiscan_3dvsystems_zmini&SubCatID_=53, Retrieved Jul. 13, 2009, 2 pages.
ISA Korean Intellectual Property Office, International Search Report and Written Opinion Issued in Application No. PCT/US2010/047564, dated Apr. 27, 2011, WIPO, 8 pages.
State Intellectual Property Office of the People's Republic of China, First Office Action Issued in Chinese Patent Application No. 201080043779.5, dated Apr. 3, 2013, 11 pages.
State Intellectual Property Office of the People's Republic of China, Second Office Action Issued in Chinese Patent Application No. 201080043779.5, dated Sep. 22, 2013, 6 pages.
State Intellectual Property Office of the People's Republic of China, Third Office Action Issued in Chinese Patent Application No. 201080043779.5, dated Feb. 7, 2014, 6 pages.
Japanese Patent Office, Office Action Issued in Japanese Patent Application No. 2012-532098, dated Apr. 22, 2014, 5 pages.
European Patent Office, Search Report Issued in European Patent Application No. 10821000.6, dated Sep. 29, 2014, Germany, 3 pages.
European Patent Office, Office Action Issued in European Patent Application No. 10821000.6, dated Oct. 21, 2014, Germany, 6 pages.
Japanese Patent Office, Office Action Issued in Japanese Patent Application No. 2012-532098, dated Dec. 25, 2014, 4 pages.
European Patent Office, Office Action Issued in European Patent Application No. 10821000.6, dated Apr. 20, 2015, Germany, 4 pages.
ISA European Patent Office, International Search Report and Written Opinion Issued in PCT Application No. PCT/US2017/015926, dated Apr. 20, 2017, WIPO, 16 Pages.

\* cited by examiner

CAMERA WITH LIGHT VALVE OVER SENSOR ARRAY

BACKGROUND

Flat- and depth-imaging digital cameras are available as discrete systems and as device components, and some devices incorporate both flat- and depth-imaging functionality. The combination of flat and depth imaging is typically achieved using separate, discrete sensor arrays.

SUMMARY

One aspect of this disclosure is directed to a camera. The camera includes a sensor array including a plurality of individually addressable sensor elements, each of the plurality of sensor elements responsive to incident light over a broad wavelength band. Covering the sensor array is at least one light valve switchable electronically between closed and open states. The light valve is configured to, in the closed state, block light of a stopband and transmit light outside the stopband, and, in the open state, transmit the light of the stopband. An electronic controller of the camera is configured to switch the light valve from the closed to the open state and, synchronously with switching the light valve, address the sensor elements of the sensor array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve the disadvantages identified in this disclosure.

DETAILED DESCRIPTION

Images acquired concurrently from different sensor arrays may exhibit parallax, which is objectionable if the images are to be registered to each other. Beam splitting optics may be used to align, in effect, the two sensor arrays on the same optical axis, but this approach requires tight manufacturing tolerances, adds complexity, and may reduce the signal-to-noise ratio for both flat and depth imaging by dividing the available image intensity between the two arrays.

Attempts to acquire flat and depth images using the same sensor array may be complicated by the different wavelength bands used by the respective imaging processes. Flat imaging typically uses broadband visible light as the illumination source, while depth-imaging typically uses narrow-band infrared (IR) light. In one approach, a specialized array of filter elements is arranged in registry with the sensor elements of the imaging sensor. The filter array includes a repeated tiling of subarrays having visible-transmissive, IR blocking elements as well as IR-transmissive, visible-blocking elements. A disadvantage of this approach is that both visible and IR images are acquired on less than the full area of the sensor array, which decreases both the resolution and the signal-to-noise ratio for both images.

Disclosed herein is a combination flat- and depth-imaging camera that overcomes the issues noted above. The camera may sequentially acquire a depth image under active, narrow-band IR illumination, and a color or monochrome image under ambient illumination. Both images are acquired on the same sensor array, which is operated in a time multiplexed manner. An electrically switchable light valve covering the sensor array is used to block visible light during the IR depth acquisition. After the depth image is acquired, the light valve is opened, the active illumination used for depth imaging is switched off and the visible flat image is acquired. Preferably both images are acquired within the same video or image frame, effectively providing concurrent flat- and depth-image acquisition at the full frame rate. Advantageously, the entire sensor array may be used to acquire the IR image, while non-useful visible wavelengths are rejected. During monochrome or color-image acquisition, the entire sensor array is made responsive to visible light.

Aspects of this and other implementations will now be described by example, and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic not necessarily drawn to scale. Rather, the various drawing scales, aspect ratios, and numbers of components shown in the figures may be purposely distorted to make certain features or relationships easier to see. In this disclosure, the term 'visible' is applied to the portion of the electromagnetic spectrum from about 400 to about 700 nanometers (nm). Any longer wavelength is referred to as 'infrared', including so called near-infrared wavelengths of about 850 nm, for example.

Figure 1:
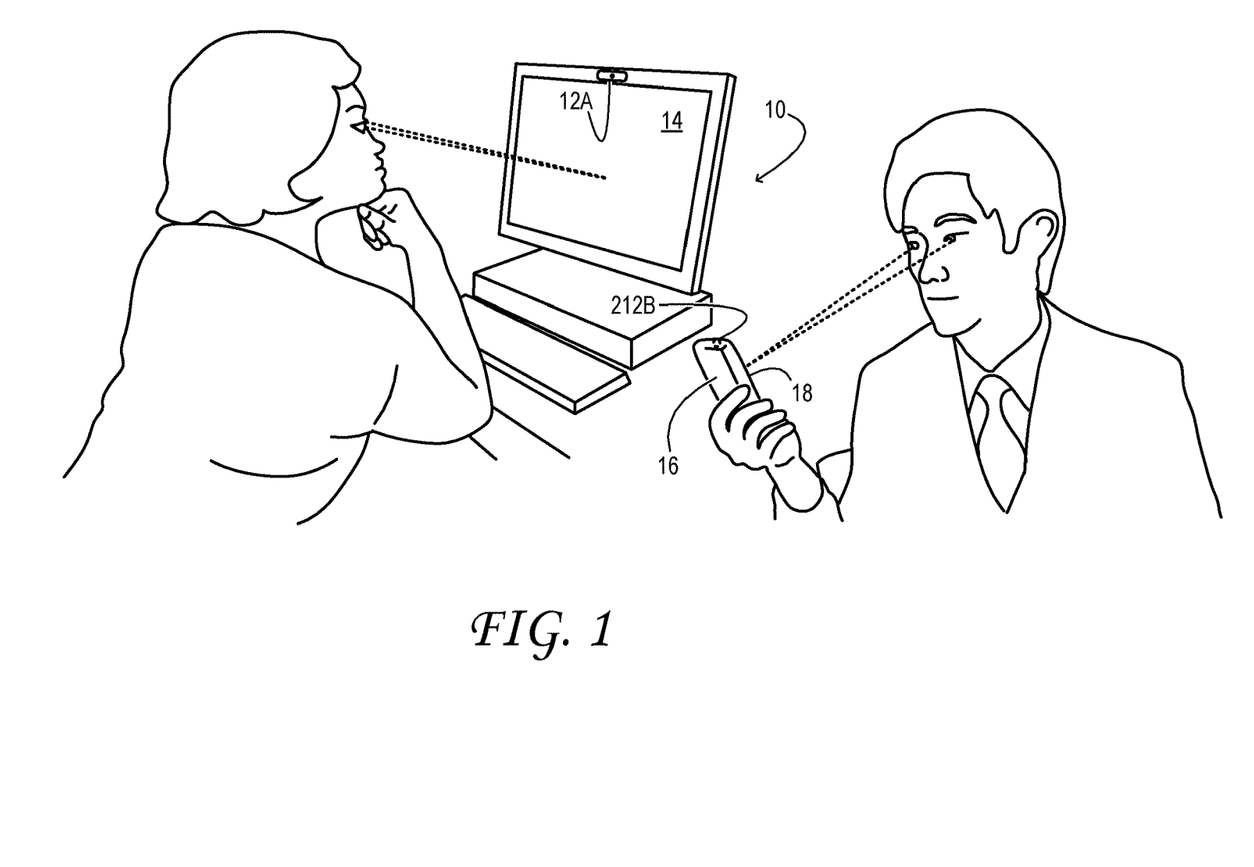
FIGS. 1, 2, and 3 show various example camera-enabled electronic devices and associated cameras.
Figure 2:
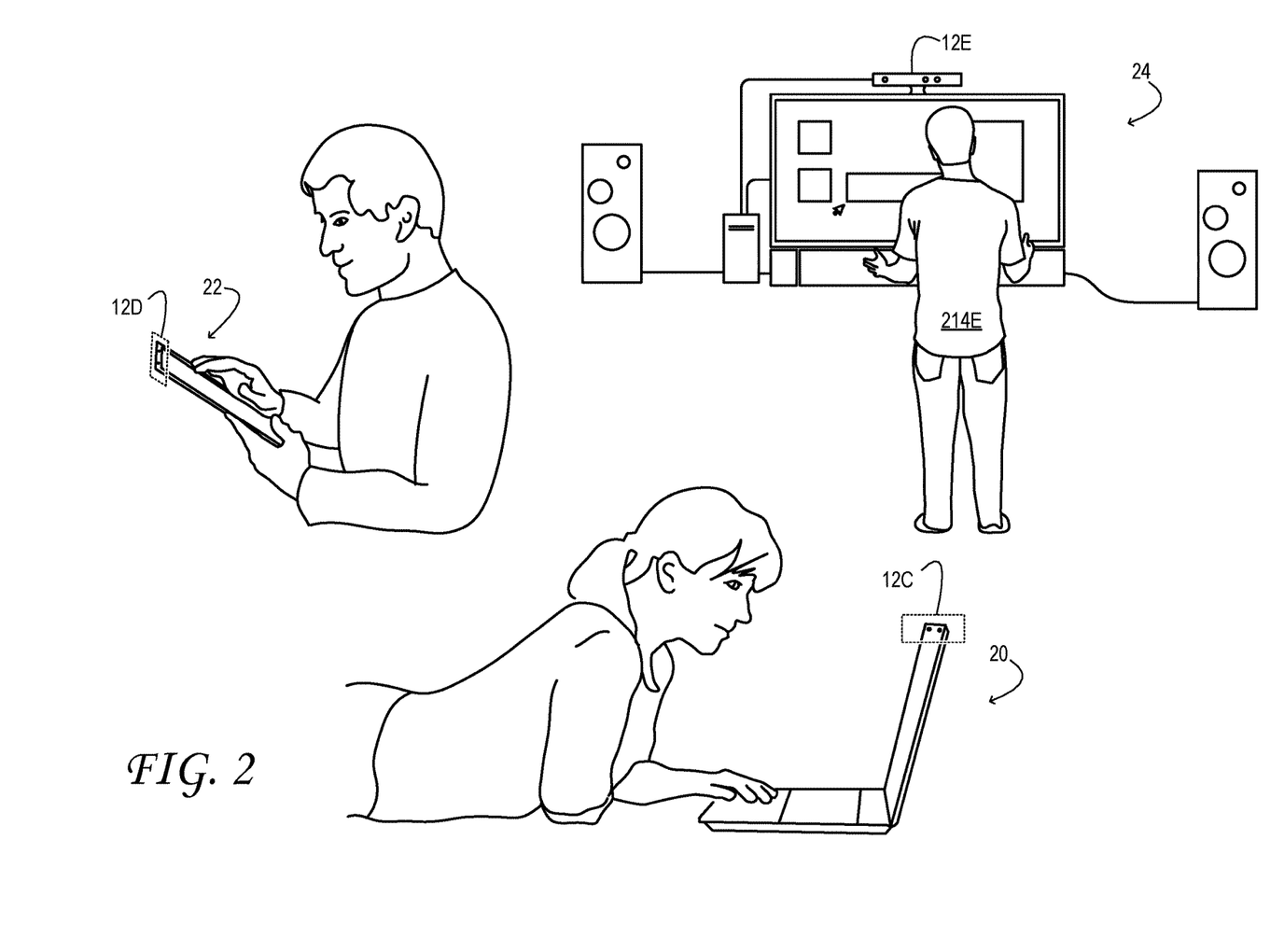
Figure 3:
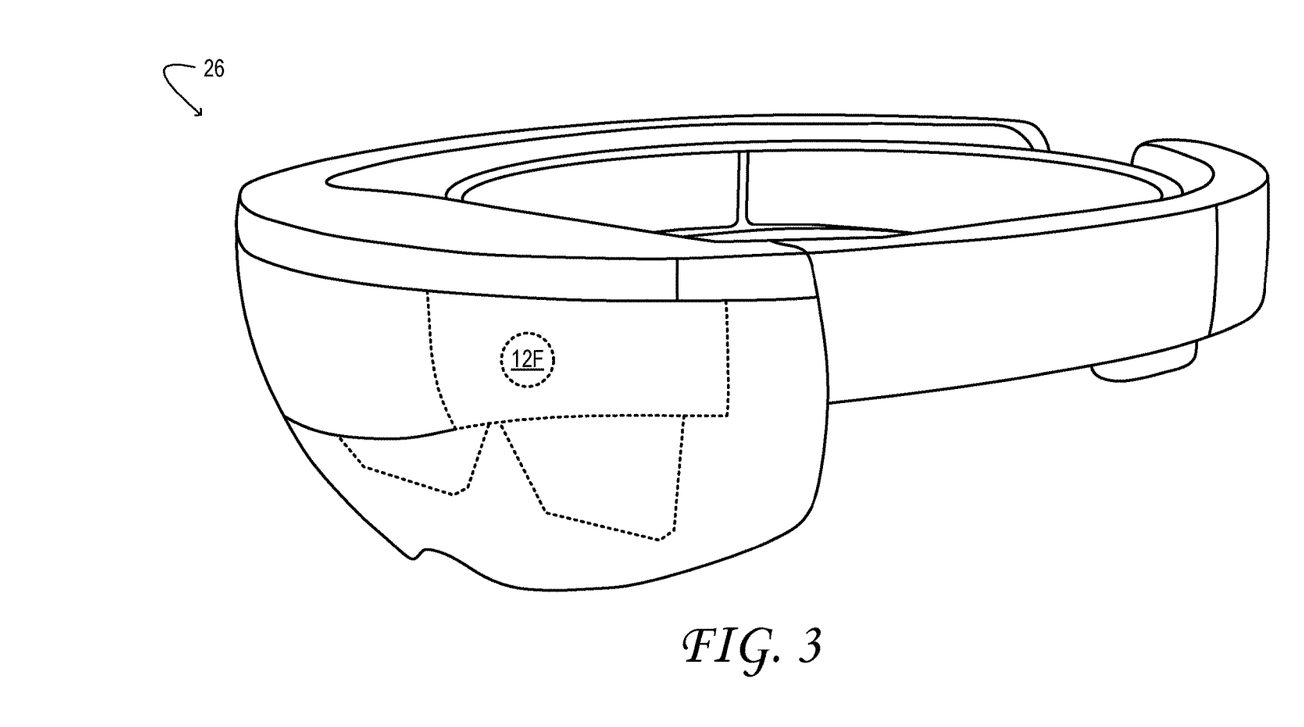

FIGS. 1, 2, and 3 show various camera-enabled electronic devices and associated cameras 12. FIG. 1 shows a desktop computer system 10 with a web camera 12A built into monitor 14 of the computer system. FIG. 1 also shows a smartphone 16 with a camera 12B arranged behind display bezel 18. FIG. 2 shows a laptop computer system 20 and integrated camera 12C, a tablet computer system 22 and integrated camera 12D, and a home-theatre system 24 with peripheral camera 12E. FIG. 3 shows a head-mounted augmented-reality display system 26 having an integrated camera 12F.

Figure 4:
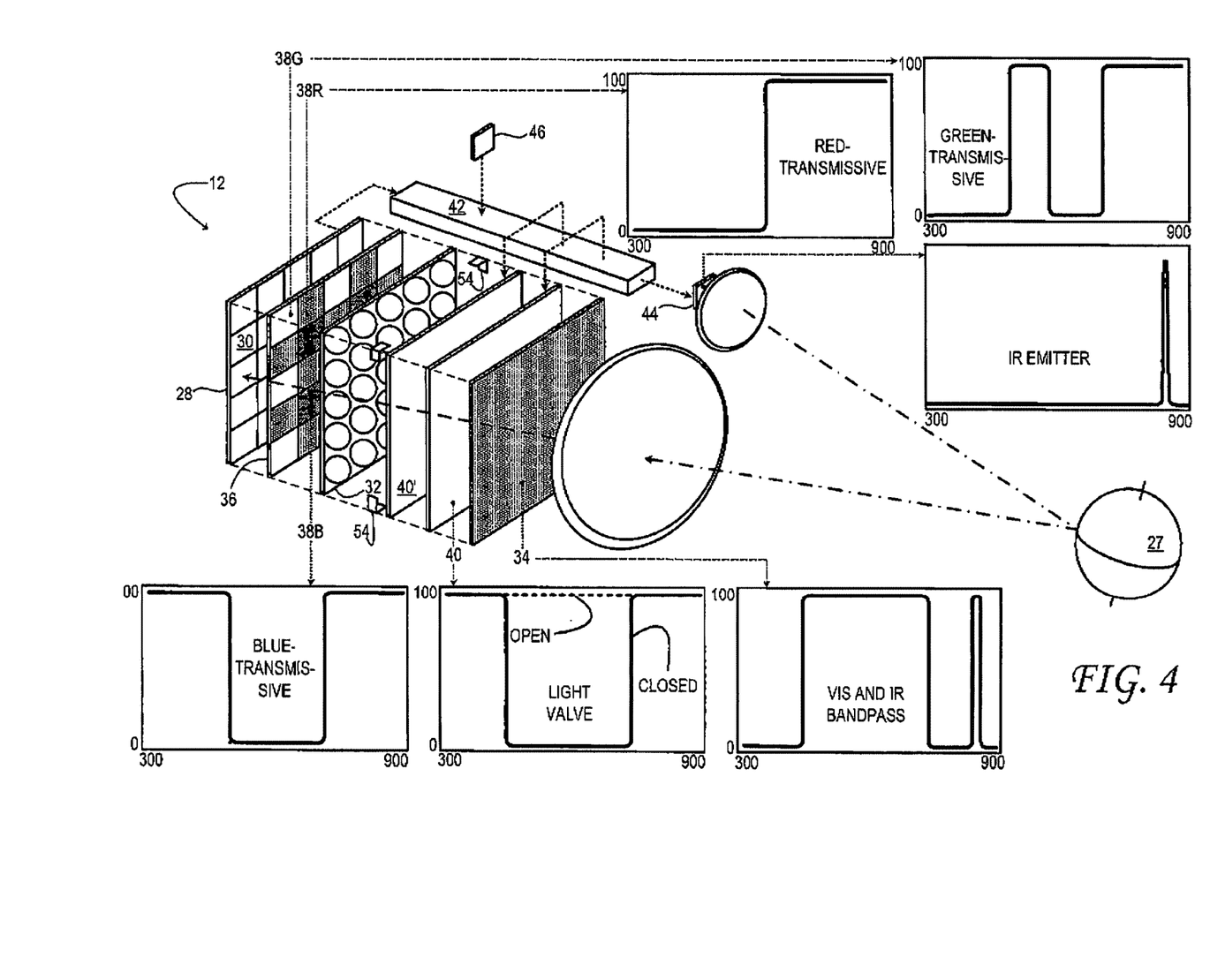
FIG. 4 is an exploded, schematic view showing aspects of an example camera having a multiplexed sensor array.

FIG. 4 shows aspects of an example camera 12. The term 'camera' refers herein to any imaging component having at least one optical aperture and sensor array configured to image a scene or subject 27. Camera 12 includes a sensor array 28 of individually addressable sensor elements 30. In some implementations, the sensor elements may be complementary metal-oxide semiconductor (CMOS) elements, but other suitable architectures are envisaged as well. Each sensor element is intrinsically responsive to light over a broad wavelength band. For silicon-based sensor elements, the wavelength response may range from 300 to 1200 nm. Microlens array 32 is optionally arranged directly over sensor array 28 to provide a larger acceptance cone at each of the sensor elements, for increased collection efficiency.

Due to the broad wavelength response of sensor elements 30, camera 12 may include one or more passive filters 34 arranged parallel to the sensor array and configured to limit the wavelength response of the sensor array. The passive filters reduce noise by excluding photons of wavelengths not intended to be imaged. Typically, an IR-imaging camera may include a visible bandstop filter. Conversely, a visible-imaging camera may include IR and ultraviolet (UV) cutoff filters. In implementations in which both visible and IR response is desired, the one or more passive filters 34 may include a visible and narrow-band IR bandpass filter.

Configured for visible as well as IR imaging, camera 12 may also include a color filter array (CFA) 36 of color filter elements 38. The color filter elements are arranged in registry with sensor elements 30 of sensor array 28. An example CFA may present a Bayer pattern—i.e., a repeated tiling of 2×2 subarrays having two green-transmissive elements 38G, one blue-transmissive element 38B, and one red-transmissive element 38R in each subarray, for example. In this implementation, the integrated response from sensor array 28 may be converted into a full-color image using a de-mosaicing algorithm. In implementations in which both visible and IR response is required at each sensor element, all of the color filter elements may be highly transmissive in the IR band of interest. Being transmissive to both visible and IR light, however, neither CFA 36 nor passive filters 34 will exclude visible light as a noise source in IR imaging. Nor will they exclude IR light as a noise source in visible imaging. For this purpose, in implementations in which both visible and IR imaging are provided, an electronically switchable light valve 40 is included.

In FIG. 4, accordingly, electronically switchable light valve 40 is arranged in front of and parallel to sensor array 28, so as to optically cover the sensor array. The light valve is switchable electronically between closed and open states. In the closed state, the light valve blocks light of a stopband and transmits light outside the stopband. In the open state, the light valve transmits the light both inside and outside the stopband. In some implementations, the light valve may be broadly transmissive in the open state—i.e., transmitting all of the wavelengths blocked and transmitted in the closed state. Blocked light may be absorbed, reflected, and/or scattered by the light valve, depending on the implementation.

Electronic controller 42 of FIG. 4 may include a microprocessor and associated computer memory. The computer memory may hold instructions that cause the microprocessor to enact any operation, algorithm, computation, or transformation disclosed herein. In some implementations, the microprocessor may take the form of an application-specific integrated circuit (ASIC) or system-on-a-chip (SoC), in which some or all of the instructions are hardware- or firmware-encoded. Electronic controller 42 is configured to repeatedly (e.g., periodically) switch light valve 40 from the closed to the open state and, synchronously with switching the light valve, address sensor elements 30 of sensor array 28. In some implementations, the stopband blocked by the light valve may be a visible band of any desired wavelength range. Accordingly, the light outside the stopband may include IR light. This configuration is useful for combination visible and IR imaging, particularly when the visible image is acquired under ambient light and the IR image is acquired under active illumination.

Camera 12 of FIG. 4 includes an IR emitter 44, such as one or more IR light-emitting diodes (LEDs) or an IR laser. Electronic controller 42 is configured to modulate IR emitter 44, synchronously with switching light valve 40 into the closed or open state and addressing sensor elements 30. For example, in combined visible- and IR-imaging implementations where the wavelength band blocked by the light valve is a visible band, the electronic controller may be configured to switch the light valve from the open to the closed state, concurrently activate (e.g., energize) the IR emitter, and begin addressing sensor array 28 for IR image acquisition. After the IR image is acquired, the electronic controller may switch the light valve back to the open state, concurrently deactivate the IR emitter, and begin addressing the sensor array for visible image acquisition.

The term 'modulate' as applied to IR emitter 44 may include activating or deactivating the IR emitter, as described above, and, in some implementations, periodically varying the intensity of the IR emission at a high frequency (e.g., 100 MHz). Likewise, the term 'address' as applied to sensor array elements 30 may have a somewhat different meaning depending on the imaging mode described. For flat-imaging—both visible and IR—addressing the sensor elements may include integrating the intensity of light received at each sensor element 30 and associating the integrated intensity with the portion of the image corresponding to that element. For depth imaging, the sensor elements may be addressed differently. Here, addressing the sensor elements may include resolving a phase offset from each sensor element relative to the periodic modulation of the IR emitter (as described further below). The phase offset, optionally converted into the depth domain, may be associated with the portion of the image corresponding to the sensor element addressed. In some implementations, a series of IR acquisitions in rapid succession may be used to obtain the phase offset. In combination depth- and flat-imaging applications, both of the above addressing modes may be used in an alternating (i.e., multiplexed) manner synchronously timed with corresponding opening and closing of the light valve 40.

The phase-discriminating time-of-flight (ToF) approach described above is one of several depth-imaging technologies lying within the metes and bounds of this disclosure. In general, a depth-imaging camera may be configured to acquire one or more depth maps of a scene or subject. The term 'depth map' refers to an array of pixels registered to corresponding regions $(X_i, Y_i)$ of an imaged scene, with a depth value $Z_i$ indicating, for each pixel, the depth of the corresponding region. 'Depth' is defined as a coordinate parallel to the optical axis of the camera, which increases with increasing distance from the camera. Operationally, some depth-imaging cameras may be configured to acquire 2D image data, from which a depth map is obtained via downstream processing. The term 'depth video' refers herein to a time-resolved sequence of depth maps.

The configuration of a depth-imaging camera may differ from one implementation to the next. In one example, brightness or color data from two, stereoscopically oriented sensor arrays in a depth-imaging camera may be co-registered and used to construct a depth map. More generally, depth coordinates into a scene may be obtained using one or more flat-imaging cameras, with optical-tomography based co-registration of imaged features. Hyperspectral (e.g., visible+IR and/or UV) flat imaging may be used with this approach, for improved feature discrimination. In other examples, an illumination source associated with a depth-imaging camera may be configured to project onto the subject a structured illumination pattern comprising numerous discrete features—e.g., lines or dots. A sensor array in the depth-imaging camera may be configured to image the structured illumination reflected back from the subject. Based on the spacings between adjacent features in the various regions of the imaged subject, a depth map of the subject may be constructed. In ToF implementations, the illumination source—an IR emitter—may project pulsed or otherwise modulated IR illumination towards the subject. The sensor array of the depth-imaging camera may be configured to detect the phase offset between the illumination reflected back from the subject and the modulated emission. In some implementations, the phase offset of each sensor element may be converted into a pixel-resolved time-of-flight of the pulsed illumination, from the illumination source to the subject and then to the array. ToF data may then be converted into depth.

Continuing in FIG. 4, light valve 40 may be one of a plurality of light valves stacked in series (e.g., parallel to sensor array 28). Electronic controller 42 may be configured to switch each of the light valves from its closed to open state and synchronously address the sensor elements 30 of the sensor array. Concurrent blocking and unblocking may be used, for instance, when a single light valve is insufficiently blocking on its own. A single light valve may be insufficiently blocking due to insufficient bandwidth and/or insufficient attenuation within the stopband. In alternative implementations, two or more independently switchable light valves may be included, with a different stopband for each of the light valves. For example, the stopband of first light valve 40 may be a broad, visible band, and the stopband of second light valve 40' may be an IR band. This configuration may be used in combination visible- and IR-imaging cameras, when it is desirable to prevent even ambient IR from corrupting the visible image. In this implementation, the electronic controller may be configured to switch light valve 40 to the closed state, switch light valve 40' to the open state, and concurrently activate IR emitter 44 and begin addressing sensor array 28 for IR image acquisition. After the IR image is acquired, the electronic controller may switch light valve 40 back to the open state, switch light valve 40' back to the closed state, and concurrently deactivate the IR emitter and begin addressing the sensor array for visible image acquisition.

Figure 5:
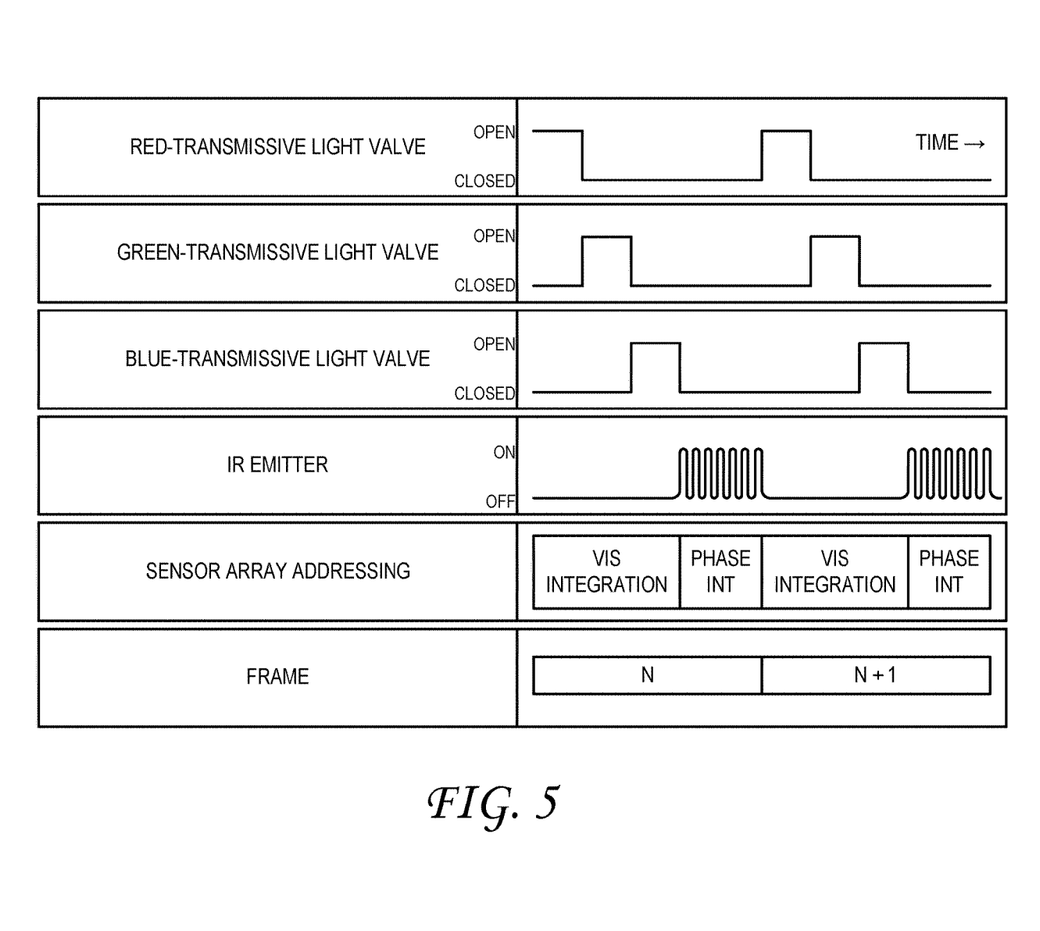
FIG. 5 shows aspects of an example timing diagram for a camera having a multiplexed sensor array.

In other examples where a plurality of light valves 40 are stacked in series (e.g., parallel to sensor array 28), at least some of the stopbands may be relatively narrow bands in the visible. For instance, the camera may include three stacked light valves with stopbands centered in the red, green, and blue, respectively. In one implementation, the three light guides may be switched in concert between closed and open states, mimicking the functionality of the broadband visible light valve described above. In other implementations, however, the three light guides may be multiplexed in sequence to image the subject in independent red, green, and blue channels. Accordingly, cameras equipped with plural light guides having visible stopbands may omit CFA 36. In implementations in which IR imaging is also desired, all of the light valves may be switched into the closed state over an additional, IR-imaging time window. FIG. 5 shows an example timing diagram for this application.

An advantage of the above implementation over cameras relying on CFA 36 for color discrimination is that the whole of sensor array 28 may be used for each channel. This provides increased resolution and, potentially, increased signal and better color reproduction. In such implementations, however, the latency of each of the light valves must be short enough to acquire both IR and three or more images at the desired frame rate.

As shown in FIG. 5, controller 42 may be configured to maintain a given light valve 40 in the closed state for a repeatable (e.g., periodic) closed duration and in the open state for a repeatable (e.g., periodic) open duration. In some combined visible- and IR-imaging implementations, visible-image acquisition may take place over a longer interval than IR-image acquisition. More generally, the relative durations of the visible- and IR-image acquisition may vary depending on the expected use scenario (e.g., outdoor daytime use, where intense ambient illumination is available, versus indoor or night use). Further, in some implementations, electronic controller 42 may be configured to sense ambient-light conditions and vary the closed and open durations accordingly. To this end, a non-imaging illumination sensor 46 may be operatively coupled to electronic controller 42, or sensor array 28 itself may provide illumination-sensing functionality.

In still other implementations, a stack of one or more light valves 40 with different stopbands may be used to control saturation in flat monochrome imaging done under variable lighting conditions. Controller 42 may sense the ambient light level and determine how much of the broadband spectrum to include in the flat image to be acquired. Under very dim lighting, all of the light valves may be maintained in the open state. Under brighter lighting, one or more of the light valves may be switched to the closed state, to avoid saturation of the sensor elements and preserve image quality. Under the brightest conditions, all light valves may be closed, so that only a narrow wavelength band—e.g., narrow-band IR—gets through to the sensor array. This may be the same band used for IR-based depth imaging if the camera is a combination flat monochrome and depth-imaging camera. In this application, the stopbands of the various light valves may be overlapping or non-overlapping.

Figure 6:
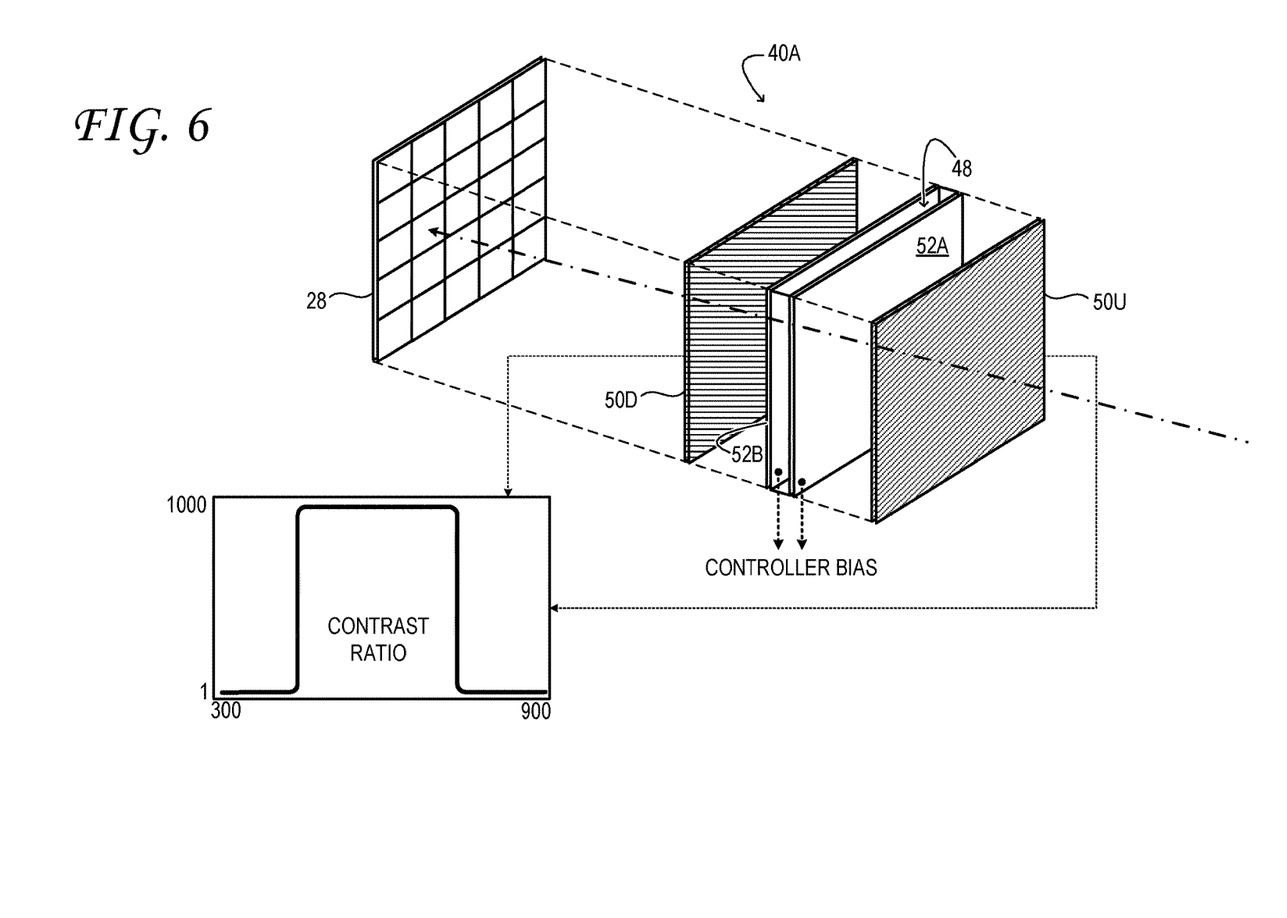
FIG. 6 is an exploded, schematic view showing aspects of an example switchable light guide for a camera having a multiplexed sensor array.

Light valve 40 may be configured differently in the different implementations of camera 12. FIG. 6 shows aspects of an example light valve 40A. Light valve 40A includes an electrostatically polarizable liquid-crystal (LC) layer 48 and a pair of fixed (e.g., linear) polarizers 50U and 50D, each arranged parallel to sensor array 28. The LC layer may be less than 10 micrometers in thickness and sandwiched between two conductive glass or transparent plastic electrodes 52A and 52B. One or more of the liquid-crystal layer and fixed polarizers may be wavelength responsive. For example, each fixed polarizer may provide a high contrast ratio in the stopband of the light valve and a lower contrast ratio outside the stopband. Alternatively or in addition, the LC layer may exhibit wavelength-dependent rotation of the polarization plane—e.g., high rotation in the stopband and minimal rotation elsewhere.

In some implementations, the transmission plane of downstream fixed polarizer 50D is perpendicular to that of upstream fixed polarizer 50U. When electrodes 52A/52B are unbiased, LC layer 48 adopts a twisted nematic LC structure. The thickness of the LC layer is such that when linearly polarized light passes through the LC layer, its polarization rotates by 90°. In this configuration, where the polarizers on either side of the LC layer are crossed, light rotated by the LC layer will be transmitted. When the electrodes are biased, however, the twisted structure is formed. In that state, the LC layer does not rotate the polarization of the incident light, and thus the light is blocked. In this manner, light valve 40A enables electronic control of light transmission.

In the alternative implementation, the transmission planes of upstream fixed polarizer 50U and downstream fixed polarizer 50D are arranged parallel to each other. In this case the blocking and transmission states are reversed—viz., light of the stopband is transmitted when electrodes 52A/52B are biased, and blocked otherwise. Accordingly, the fixed polarizer orientation may be set based on the anticipated duty cycle of the light valve, to conserve power—i.e., if the anticipated duty cycle calls for the light valve to be open more often than closed, then the orientation may be set so that the light valve is open by default, when there is no energy provided to the electrodes, but if the anticipated duty cycle calls for the light valve to be closed more often than open, then the orientation may be set so that the light valve is closed by default, when there is no energy provided to the electrodes.

In summary, the function of upstream fixed polarizer 50U is to select a polarization state for the incident light, the function of LC layer 48 is to rotate the polarization state of incident light, and the function of downstream fixed polarizer 50D is to block or transmit the light, based on its final polarization state. If the fixed polarizers are limited to the specified stopband—i.e. exhibiting a high contrast ratio in that band and unit contrast ratio elsewhere, then their polarizing function will be limited to only the stopband. Furthermore, if the fixed polarizers are configured to provide high transmission outside the stopband, then they will be essentially transparent at those wavelengths. A light valve configured in this manner has significant advantages, such as low cost, low power operation, low driving voltage, and fast response time.

In some instances, the molecules of LC layer 48 may act as scattering centers to incident light, causing some degree of ghosting and flare in acquired images. This phenomenon is typically more significant at lower wavelengths. In order to reduce the effects of scattering, light valve 40A may be positioned as close to sensor array 28 as possible—e.g., coupled directly to sensor array 28 or to microlens array 32 of the sensor array. For example, FIG. 4 schematically shows micropedestals 54 configured to couple light valve 40A very close to sensor array 28.

The switching time for LC layer 48 may be 5 milliseconds or less. Accordingly, two or more image acquisitions may be completed within a single video or image frame, effecting quasi-simultaneous imaging in two or more wavelength bands. It may be possible to achieve even lower switching times using appropriate LC materials, which would be advantageous, for example, in reducing motion blur between corresponding visible and IR images.

Figure 7:
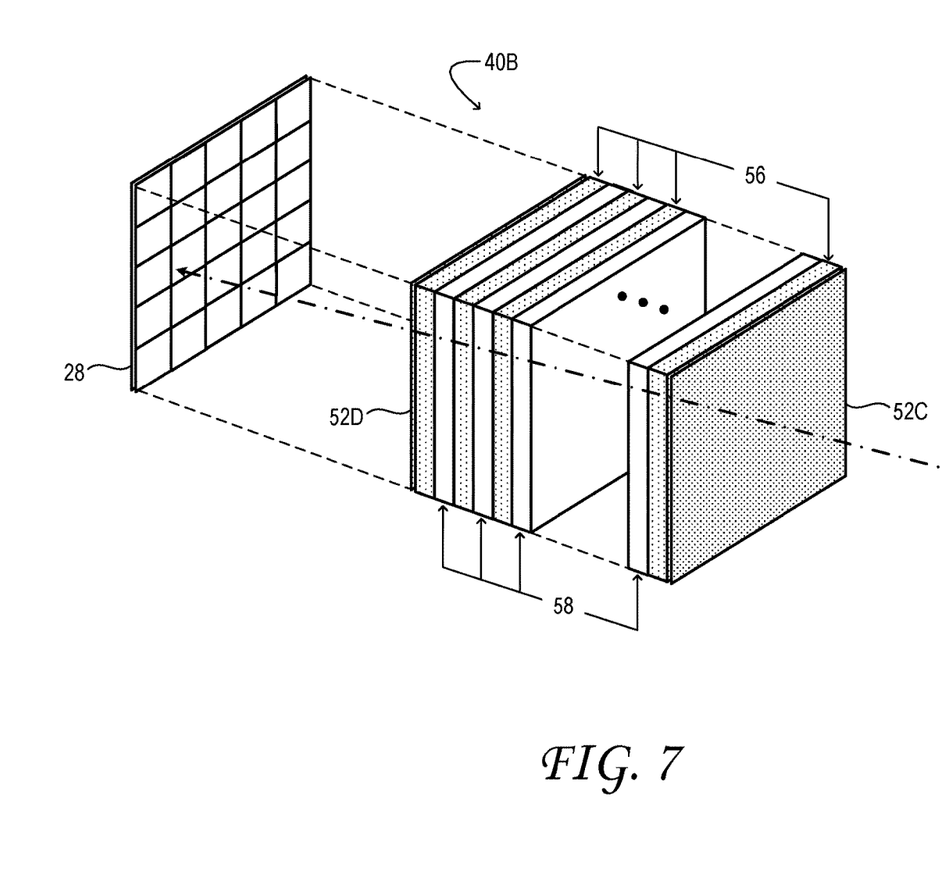
FIG. 7 is an exploded, schematic view showing aspects of another example switchable light guide for a camera having a multiplexed sensor array.

FIG. 7 shows aspects of another example light valve 40B. Light valve 40B includes an electronically switchable distributed Bragg reflector (DBR) arranged parallel to the sensor array. A DBR includes multiple periods of alternating materials with at least two different refractive indices. The transmission and reflection spectrum of a DBR depends on the refractive indices and on the period thickness as well as the number of periods. If one material in each period is replaced with a layer whose refractive index can be varied electrically, such as LC layer 56, then the transmission spectrum of the DBR becomes electrically switchable. In such a device, one or more wavelength ranges may be blocked due to reflection from the DBR, rather than absorption. In the implementation shown in FIG. 7, LC layers 56 are sandwiched between static layers 58—e.g., silica or titanium dioxide. The electric field is provided through transparent electrodes 52C and 52D. One advantage of this variant over the simpler LC layer is that non-polarized light may be blocked and unblocked. Thus it is possible to achieve high transmission in the stopband in the open state of the light valve, and high transmission of light outside the stopband under all conditions. This advantage may be further amplified in stacked, multiple light-valve configurations, where accumulated losses through plural polarization stages may be an issue. Notwithstanding, if all polarizers of a plurality of LC layers have the same polarization—e.g., if the exit polarizer of a given stage has the same orientation as the entry polarizer of the immediately downstream stage, then losses in the LC-layer implementation may be reduced.

No aspect of the foregoing configurations should be interpreted in a limiting sense, for numerous alternative configurations are envisaged as well. For example, while the above examples stress the value of selectively blocking ambient visible light for combined visible and IR imaging, the stopband may be an IR band in alternative implementations. There, the light outside the stopband may include visible light. Other example light valves may use a mechanical structure that incorporates separate passive optical filters—e.g., red, green, blue, and IR. Using this approach, the light valve may switch to the desired optical filter by moving or rotating the mechanical structure to bring the appropriate filter in front of sensor array 28. Envisaged filter-switching modalities include voice-coil motors and piezoelectric actuators, for example. In this solution, the switching modalities may be specially configured to meet the size, speed and reliability requirements of the camera.

Figure 8:
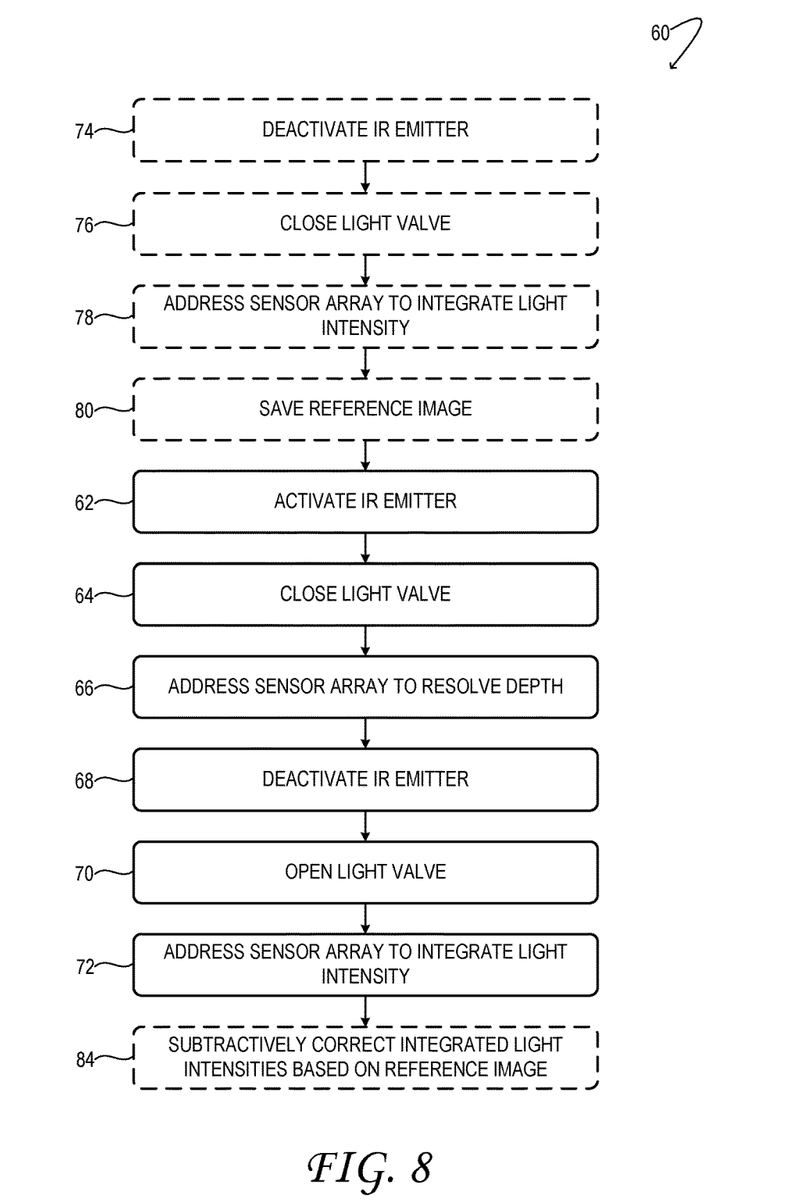
FIG. 8 illustrates an example combination depth- and flat-image acquisition method enacted in an electronic controller of a camera having a multiplexed sensor array.

FIG. 8 is a flowchart for an example combination depth- and flat-image acquisition method 60 that may be enacted in electronic controller 42 of camera 12. To that end, the electronic controller may include a logic machine, such as a processor, and an associated computer memory machine. In some implementations, the logic machine and some or all of the computer-memory machine may be combined as a system-on-a-chip, or the like.

At 62 of method 60, an IR emitter 44 of the camera is activated. At 64 the light valve is switched to the closed state. At 66 sensor array 28 is addressed so as to resolve depth to an imaged locus at each sensor element 30 of the sensor array while the light valve is in the closed state. In phase-sensitive ToF implementations, resolving depth to an image locus may include resolving a phase offset from each sensor element relative to IR-emitter modulation. In some implementations, each sensor element may be addressed several times to acquire a single phase capture. At 68 the IR emitter is deactivated. At 70 the light valve is switched from the closed to the open state. At 72 the sensor array is addressed so as to integrate light intensity received at each element of the sensor array when the light valve is in the open state. In color-imaging implementations, integrating light intensity received at each element of the sensor array may include integrating light intensity in three or more color channels. In monochromatic visible-imaging implementations, light intensity may be integrated in a single channel.

Method 60 may include additional, optional steps intended to correct the visible image for ambient IR irradiation which passes through the one or more filters and light valves of camera 12. At 74, accordingly, IR emitter 44 is deactivated. At 76 the light valve is switched to the closed state. At 78 the sensor array is addressed so as to integrate light intensity received at each element of the sensor array, to assemble a reference image while the light valve is in the closed state. At 80 the reference image is saved. At 84, subsequent light intensities integrated when the light valve is in the open state are subtractively corrected based on the reference image.

One aspect of this disclosure is directed to a camera comprising a sensor array, at least one light valve, and an electronic controller. The sensor array includes a plurality of individually addressable sensor elements, each of the plurality of sensor elements responsive to incident light over a broad wavelength band. Optically covering the sensor array, is at least one light valve switchable electronically between a closed state and an open state, the light valve configured to, in the closed state, block light of a stopband and transmit light outside the stopband, and, in the open state, transmit the light of the stopband. The electronic controller is configured to switch the light valve from the closed state to the open state and, synchronously with switching the light valve, address the sensor elements of the sensor array.

In some implementations, the stopband is a visible band. In some implementations, the light outside the stopband includes infrared light. In some implementations, the camera further comprises an infrared emitter, and the electronic controller is further configured to, synchronously with switching the light valve and addressing the sensor elements, energize the infrared emitter. In some implementations, addressing the sensor elements includes, in only one of the closed and open state of the light valve, resolving a phase offset from each of the plurality of sensor elements relative to infrared-emitter modulation. In some implementations, the controller is configured to maintain the light valve in the closed state for a repeatable closed duration and in the open state for a repeatable open duration, and to vary the closed and open durations. In some implementations, the camera further comprises one or more passive filters configured to limit response of the sensor array. In some implementations, the camera further comprises one or more passive filters configured to limit response of the sensor array, the one or more passive filters including an array of color filter elements arranged in registry with the sensor elements of the sensor array. In some implementations, the light valve includes an electrostatically polarizable liquid-crystal layer and a fixed polarizer, wherein at least one of the liquid-crystal layer and the fixed polarizer exhibit wavelength-dependent transmissivity. In some implementations, the fixed polarizer provides a higher contrast ratio in the stopband than outside the stopband. In some implementations, the fixed polarizer is a first fixed polarizer, the light valve includes a second fixed polarizer, and the second fixed polarizer has a transmission plane perpendicular to that of the first fixed polarizer. In some implementations, the light valve includes an electronically switchable distributed Bragg reflector. In some implementations, the light valve is one of a plurality of stacked light valves, the electronic controller is configured to switch each of the light valves from the closed to the open state and synchronously address the sensor elements of the sensor array, and the stopband is different for each of the light valves. In some implementations, the stopband of a first of the plurality of light valves is a visible band, and the stopband of a second of the plurality of light valves is an infrared band. In some implementations, the light valve is coupled directly to the sensor array or to a microlens array portion of the sensor array.

Another aspect of this disclosure is directed to a combination depth and flat-image camera comprising a sensor array, at least one light valve, an infrared emitter, and an electronic controller. The sensor array includes a plurality of individually addressable sensor elements, each of the plurality of sensor elements responsive to incident light over visible and infrared bands. Optically covering the sensor array, is at least one light valve switchable electronically between a closed state and an open state, the light valve configured to, in the closed state, block light of the visible band and transmit light outside the visible band, and, in the open state, transmit the light of the visible band. The electronic controller is configured to: activate the infrared emitter, switch the light valve to the closed state, resolve depth to an imaged locus at each element of the sensor array by addressing the sensor array while the light valve is in the closed state, deactivate the infrared emitter, switch the light valve from the closed to the open state, and integrate light intensity received at each of the plurality of sensor elements of the sensor array when the light valve is in the open state.

In some implementations, resolving depth to an image locus includes resolving a phase offset from each sensor element relative to infrared-emitter modulation. In some implementations, integrating light intensity received at each of the plurality of sensor elements of the sensor array includes integrating light intensity in three or more color channels. In some implementations, the controller is further configured to: deactivate the infrared emitter, switch the light valve to the closed state, integrate light intensity received at each element of the sensor array to assemble a reference image while the light valve is in the closed state, and subtractively correct, based on the reference image, subsequent light intensities integrated when the light valve is in the open state.

Another aspect of this disclosure is directed to a combination depth and flat-image camera comprising a sensor array, at least one light valve, one or more passive filters, an infrared emitter, and an electronic controller. The sensor array includes a plurality of individually addressable sensor elements, each of the plurality of sensor elements responsive to incident light over visible and infrared bands. Optically covering the sensor array is a light valve switchable electronically between a closed state and an open state, the light valve configured to, in the closed state, block light of the visible band and transmit light outside the visible band, and, in the open state, transmit the light of the visible band. The one or more passive filters include an array of color filter elements arranged in registry with the sensor elements of the sensor array. The electronic controller is configured to: activate the infrared emitter, switch the light valve to the closed state, resolve a phase offset from each sensor element relative to infrared-emitter modulation by addressing the sensor array while the light valve is in the closed state, deactivate the infrared emitter, switch the light valve from the closed to the open state, and integrate light intensity received at each of the plurality of sensor elements of the sensor array in three or more color channels when the light valve is in the open state.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A camera comprising:
an illumination sensor;
a sensor array including a plurality of individually addressable sensor elements, each of the plurality of sensor elements responsive to incident light over a broad wavelength band;
arranged in parallel over the plurality of sensor elements of the sensor array, two or more light valves having two or more polarizable liquid-crystal layers arranged between fixed polarizers, wherein each light valve is switchable electronically between a closed state and an open state and configured to, in the closed state, block light of a visible stopband and transmit light outside the visible stopband, and, in the open state, transmit the light of the visible stopband, wherein the visible stopband differs for each of the two or more light valves; and
coupled operatively to the illumination sensor and to each of the two or more light valves, an electronic controller configured to individually and sequentially switch the light valve from the closed state to the open state and synchronously address the sensor elements of the sensor array, such that each sensor element responds, in sequence, to the light of the visible stopband of each of the two or more light valves,
wherein the controller is configured to maintain each of the two or more light valves in the closed state for a repeatable closed duration and in the open state for a repeatable open duration, and to vary the closed and open durations responsive to output of the illumination sensor.

2. The camera of claim 1 wherein the stopband of each of the two or more light valves is a visible band.

3. The camera of claim 1 wherein, for each of the two or more light valves, the light outside the stopband includes infrared light.

4. The camera of claim 1 further comprising an infrared emitter, wherein the electronic controller is further configured to, synchronously with switching the light valve and addressing the sensor elements, energize the infrared emitter.

5. The camera of claim 4 wherein addressing the sensor elements includes, in the closed state of the two or more light valves, resolving a phase offset from each of the plurality of sensor elements relative to infrared-emitter modulation.

6. The camera of claim 1 further comprising one or more passive filters configured to limit response of the sensor array.

7. The camera of claim 1 wherein at least one of the liquid-crystal layer and at least one of the fixed polarizers of each of the two or more light valves exhibit wavelength-dependent transmissivity.

8. The camera of claim 7 wherein at least one of the fixed polarizers provide a higher contrast ratio in the stopband than outside the stopband.

9. The camera of claim 7 wherein the fixed polarizers of each of the two or more light valves include upstream and downstream polarizers with mutually perpendicular transmission planes.

10. The camera of claim 1 wherein the two or more light valves include an optically downstream light valve coupled directly to the sensor array or to a microlens array portion of the sensor array.

11. A combination depth and flat-image camera comprising:
a sensor array including a plurality of individually addressable sensor elements, each of the plurality of sensor elements responsive to incident light over visible and infrared bands;
arranged in parallel over the plurality of sensor elements of the sensor array, two or more light valves having two or more polarizable liquid-crystal layers arranged between fixed polarizers, wherein each light valve is switchable electronically between a closed state and an open state and configured to, in the closed state, block light of a visible stopband and transmit light outside the visible stopband, and, in the open state, transmit the light of the visible stopband, wherein the visible stopband differs for each of the two or more light valves;
an infrared emitter; and
coupled operatively to the infrared emitter and to each of the two or more light valves, an electronic controller configured to individually and sequentially switch each light valve from the closed state to the open state and synchronously address the sensor elements of the sensor array, such that each sensor element responds, in sequence, to the light of the visible stopband of each of the two or more light valves,
wherein the controller is further configured to maintain each of the two or more light valves concurrently in the closed state, synchronously energize the infrared emitter and address the sensor elements of the sensor array to resolve subject depth at each sensor element based on a time-of-flight measurement.

12. The camera of claim of claim 11 wherein resolving depth to an image locus includes resolving a phase offset from each sensor element relative to infrared-emitter modulation.

13. The camera of claim 11 wherein wherein addressing the sensor elements of the sensor array includes integrating light intensity in three or more color channels.

14. The camera of claim 11 wherein the controller is further configured to:
deactivate the infrared emitter;
switch the two or more light valves to the closed state;
integrate light intensity received at each element of the sensor array to assemble a reference image while the two or more light valves are in the closed state; and
subtractively correct, based on the reference image, subsequent light intensities integrated when one of the two or more light valves is in the open state.

15. A camera comprising:
a sensor array including a plurality of individually addressable sensor elements, each of the plurality of sensor elements responsive to incident light over a broad wavelength band;
arranged in parallel over the plurality of sensor elements of the sensor array, two or more light valves having two or more polarizable liquid-crystal layers arranged between fixed polarizers, wherein each light valve is switchable electronically between a closed state and an open state and configured to, in the closed state, block light of a visible stopband and transmit light outside the visible stopband, and, in the open state, transmit the light of the visible stopband, wherein the visible stopband differs for each of the two or more light valves; and
coupled operatively to each of the two or more light valves, an electronic controller configured to individually and sequentially switch each light valve from the closed state to the open state and synchronously address the sensor elements of the sensor array, such that each sensor element responds, in sequence, to the light of the visible stopband of each of the two or more light valves.

16. The camera of claim 11 wherein the time-of-flight measurement is a phase-discriminating time-of-flight measurement.

17. The camera of claim 15 wherein the two or more light valves include an upstream light valve and a downstream light valve downstream of the upstream light valve, wherein the fixed polarizers of each of the upstream and downstream light valves include an entry polarizer and an exit polarizer, and wherein the exit polarizer of the upstream light valve and the entry polarizer of the downstream light valve are oriented in parallel.

18. The camera of claim 15 wherein the two or more light valves include a first light valve having a stopband in a red spectral region, a second light valve having a stopband in a green spectral region, and a third light valve having a stopband in a blue spectral region.

\* \* \* \* \*